US009456621B2

(12) United States Patent
Green et al.

(10) Patent No.: US 9,456,621 B2
(45) Date of Patent: *Oct. 4, 2016

(54) PH ADJUSTED SOY PROTEIN ISOLATE AND USES

(75) Inventors: Brent E. Green, Warren (CA); Sarah Medina, Winnipeg (CA); Martin Schweizer, Winnipeg (CA); Kevin I. Segall, Winnipeg (CA); Johann Tergesen, Vancouver (CA); Russ Sampson, Oakville (CA); Roland Rosset, Winnipeg (CA); Curtis D. Hayden, Winnipeg (CA); Edwin Catipon, Winnipeg (CA)

(73) Assignee: BURCON NUTRASCIENCE (MB) CORP., Winnipeg, Manitoba (CA)

( * ) Notice: Subject to any disclaimer, the term of this patent is extended or adjusted under 35 U.S.C. 154(b) by 623 days.

This patent is subject to a terminal disclaimer.

(21) Appl. No.: 12/975,805

(22) Filed: Dec. 22, 2010

(65) Prior Publication Data

US 2011/0165314 A1 Jul. 7, 2011

Related U.S. Application Data

(60) Provisional application No. 61/282,141, filed on Dec. 22, 2009.

(51) Int. Cl.
*A23J 3/16* (2006.01)
*A23J 1/14* (2006.01)

(52) U.S. Cl.
CPC .. *A23J 3/16* (2013.01); *A23J 1/14* (2013.01); *A23V 2002/00* (2013.01)

(58) Field of Classification Search
USPC ............................................ 26/656; 426/656
See application file for complete search history.

(56) References Cited

U.S. PATENT DOCUMENTS

| | | | |
|---|---|---|---|
| 3,645,745 A | 2/1972 | Magnino et al. | |
| 3,713,843 A | 1/1973 | Pour-el et al. | |
| 3,736,147 A | 5/1973 | Iacobucci et al. | |
| 3,814,816 A | 6/1974 | Gunther et al. | |
| 3,817,834 A | 6/1974 | Wilson | |
| 3,853,839 A | 12/1974 | Magnino et al. | |
| 3,870,801 A | 3/1975 | Tombs | |
| 4,072,670 A * | 2/1978 | Goodnight, Jr. ......... | A23J 1/14 426/598 |
| 4,146,534 A | 3/1979 | Armstrong | |
| 4,169,090 A | 9/1979 | Murray | |
| 4,208,323 A | 6/1980 | Murray et al. | |
| 4,247,573 A | 1/1981 | Murray et al. | |
| 4,285,862 A | 8/1981 | Murray et al. | |
| 4,296,026 A * | 10/1981 | Millar ............................ | 530/378 |
| 4,328,252 A | 5/1982 | Murray et al. | |
| 4,346,122 A | 8/1982 | Orthoefer et al. | |
| 4,366,097 A | 12/1982 | Cameron et al. | |
| 4,420,425 A | 12/1983 | Lawhon | |
| 4,424,151 A | 1/1984 | Grealy et al. | |
| 4,716,044 A * | 12/1987 | Thomas et al. ................. | 426/51 |
| 5,270,450 A | 12/1993 | Westfall et al. | |
| 5,286,511 A | 2/1994 | Klavons et al. | |
| 5,844,086 A | 12/1998 | Murray | |
| 6,005,076 A | 12/1999 | Murray | |
| 6,818,246 B2 | 11/2004 | Singh | |
| 6,841,184 B2 | 1/2005 | Porter et al. | |
| 7,022,370 B2 | 4/2006 | Loh | |
| 7,709,044 B2 | 5/2010 | Ishimoto et al. | |
| 7,838,633 B2 * | 11/2010 | Samoto et al. ............... | 530/378 |
| 2005/0123649 A1 | 6/2005 | Benitez et al. | |
| 2005/0255226 A1 | 11/2005 | Schweizer et al. | |
| 2006/0062878 A1 | 3/2006 | Ruppe et al. | |
| 2007/0014910 A1* | 1/2007 | Altemueller et al. ........ | 426/590 |
| 2007/0237877 A1 | 10/2007 | Diosady et al. | |
| 2008/0160134 A1* | 7/2008 | Hestekin et al. ............... | 426/43 |
| 2009/0005544 A1 | 1/2009 | ndife et al. | |
| 2010/0098818 A1* | 4/2010 | Schweizer et al. ........... | 426/254 |

FOREIGN PATENT DOCUMENTS

| | | |
|---|---|---|
| EP | 0752212 | 1/1997 |
| WO | WO2005/107492 | 11/2005 |
| WO | WO2007/033481 | 3/2007 |
| WO | WO 2008069273 | * 12/2008 |
| WO | WO 2009/006144 | 1/2009 |
| WO | WO 2009/137934 | 11/2009 |
| WO | WO2010/045727 | 4/2010 |

OTHER PUBLICATIONS

Fraunhofer et al. "Dissolution of dental enamel in soft drinks". Mar. 29, 2004.*
Walker, David Joseph, Extraction of protein from defatted soy flake supensions at pH 4.5, ph 3.0, and pH 3.0 in the presence of calcium chloride, May 1978.
Karki, Bishnu et al, Functional properties of soy protein isolate produced from ultrasonicated defatted soy flakes, J. Am Oil Chem So (2009) 86:1021-1028.
Ford, J.R. et al, Phytic acid removal from soybeans by a lipid protein concentrate process, Journal of the America Oil Chemists Society, vol. 55, No. 4, pp. 371-375 (1978).
Jiang, Jiang et al, Structural and emulsifying properties of soy protein isolate subjected to acid and alkaline pH-shifting processes, J. Agric. Food Chem. 2009, 57, 7576-7583.
Technology of production of edible flours and protein products from soybeans. Chapter 1, Agriculture and Consumer Protection.

* cited by examiner

*Primary Examiner* — Elizabeth Gwartney
(74) *Attorney, Agent, or Firm* — Sim & McBurney

(57) ABSTRACT pH-adjusted soy protein products, particularly isolates, that have a natural pH of about 6 and have a non-beany flavor are provided by the processing of soy protein product which is completely soluble in aqueous media at a pH of less than about 4.4 and heat stable in this pH range or a concentrated soy protein solution produced in the preparation of such soy protein product.

5 Claims, No Drawings

PH ADJUSTED SOY PROTEIN ISOLATE AND USES

FIELD OF INVENTION

The present invention relates to pH adjusted soy protein isolates and their uses.

BACKGROUND TO THE INVENTION

In U.S. patent application Ser. No. 12/603,087 filed Oct. 21, 2009 (US Patent Publication No. 2010-0098818, WO 2010/045727) (S701), assigned to the assignee hereof and the disclosures of which are incorporated herein by reference, there is described the production of a novel soy protein isolate that produces transparent and heat stable solutions at low pH values and, therefore, may be used for protein fortification of in particular, soft drinks and sports drinks, as well as other aqueous systems, without precipitation of protein.

The soy protein isolate produced therein has a unique combination of parameters not found in other soy isolates. The product is completely soluble at acid pH values of less than about 4.4 and solutions thereof are heat stable in this pH range, permitting thermal processing, such as hot fill applications. No stabilizers or other additives are necessary to maintain the protein in solution or suspension. The soy protein isolate has no "beany" flavour and no off odours. The product is low in phytic acid and no enzymes are required in the production of the soy protein isolate. The soy protein isolate is also highly soluble at about pH 7.

The novel soy protein isolate having a soy protein content of at least about 90 wt %, preferably at least about 100 wt %, (N×6.25) on a dry weight basis (d.b.), is produced by a method which comprises:

(a) extracting a soy protein source with an aqueous calcium salt solution, particularly calcium chloride solution, to cause solubilization of soy protein from the protein source and to form an aqueous soy protein solution, (b) separating the aqueous soy protein solution from residual soy protein source, (c) optionally diluting the aqueous soy protein solution, (d) adjusting the pH of the aqueous soy protein solution to a pH of about 1.5 to about 4.4, preferably about 2 to about 4, to produce an acidified clear soy protein solution, (e) optionally heat treating the acidified solution to reduce the activity of anti-nutritional trypsin inhibitors and the microbial load, (f) optionally concentrating the aqueous clear soy protein solution while maintaining the ionic strength substantially constant by using a selective membrane technique, (g) optionally diafiltering the concentrated soy protein solution, (h) optionally pasteurizing the concentrated soy protein solution to reduce the microbial load, and (i) optionally drying the concentrated soy protein solution.

SUMMARY OF INVENTION

One of the important attributes of the soy protein products produced in the above-noted US patent application is the clean, non-beany flavour of the products, in contrast to conventional soy protein isolates which possess a characteristic beany flavour.

The soy protein products produced in the above-noted US patent application, when dissolved in water yield a solution with a low pH. While desirable for acidic food applications, such as the production of acidic beverages, the low pH of the soy protein products may not be ideal for other food applications, for example, foods having a near neutral pH. Rather than formulating with an acid protein ingredient and adding other ingredients to increase the pH to the desired level, it may be preferable to utilize the protein product already in a near neutral form. Commercial soy protein isolates are commonly provided at neutral or near neutral pH.

In accordance with the present invention, there are provided soy protein isolates, which lack the characteristic beany flavour of conventional soy protein isolates, which are provided at near neutral pH and, like conventional soy protein isolates, are useful in food applications under near neutral pH conditions. Some of the products provided herein are poorly soluble in water over a pH range of about 4 to about 7 while others are substantially insoluble in water over a pH range of about 2 to about 7.

Although a range of soy protein isolate products is available for food use, with a variety of functional properties, and a variety of intended applications, some of the more common applications for commercial soy protein isolates are in nutrition bars and processed meat products. The pH adjusted soy protein isolates of the present invention lack the beany flavour of conventional isolates and can replace the conventional isolates in various food products, including the types mentioned above, to provide food products having improved flavour. Preparation of the pH adjusted soy protein isolates, described below, may incorporate a heat treatment step that serves to modify the functional properties of the isolate, namely lowering the solubility of the protein and increasing the water binding capacity of the material.

Accordingly, in another aspect of the present invention, there is provided a method of producing the soy protein product, which comprises:

providing an aqueous solution of a soy protein product having a protein content of at least about 60 wt % (N×6.25) d.b. which is completely soluble in aqueous media at a pH of less than about 4.4 and heat stable at that pH range, adjusting the pH of the solution to about pH 6 to precipitate soy protein therefrom, and optionally drying the entire pH adjusted sample, or optionally recovering and drying the precipitated material, or optionally heat treating the pH-adjusted solution and then drying the entire sample, or optionally heat treating the pH-adjusted solution then recovering and drying the precipitated material.

In another aspect of the present invention, the concentrated soy protein product produced according to the procedure of above-noted US patent application may be processed to produce the pH-adjusted soy protein products provided herein. Accordingly, in a further aspect of the present invention, there is provided a method of producing a soy protein product as provided herein, which comprises:

(a) extracting a soy protein source with an aqueous calcium salt solution, particularly calcium chloride solution, to cause solubilization of soy protein from the protein source and to form an aqueous soy protein solution, (b) separating the aqueous soy protein solution from residual soy protein source, (c) optionally diluting the aqueous soy protein solution, (d) adjusting the pH of the aqueous soy protein solution to a pH of about 1.5 to about 4.4, preferably about 2 to about 4, to produce an acidified clear soy protein solution, (e) optionally heat treating the acidified solution to reduce the activity of anti-nutritional trypsin inhibitors and the microbial load, (f) concentrating the aqueous clear soy protein solution while maintaining the ionic strength substantially constant by using a selective membrane technique, (g) optionally diafiltering the concentrated soy protein solution, (h) optionally pasteurizing the concentrated soy protein solution to reduce the microbial load, (i) adjusting the pH of the aqueous soy protein solution to about pH 6 to precipitate soy protein therefrom, and optionally drying the entire pH adjusted sample or optionally recovering and drying the precipitated material or optionally heat treating the pH-adjusted solution and then drying the entire sample or optionally heat treating the pH-adjusted solution then recovering and drying the precipitated material.

The heat treatment of the pH-adjusted solution generally is effected at a temperature of about 70° to about 160° C. for about 2 seconds to about 60 minutes, preferably about 80° to about 120° C. for about 15 seconds to about 15 minutes, more preferably about 85° to about 95° C. for about 1 to about 5 minutes.

The process options described in the present application allow the production of soy protein isolates with a range of functional properties, increasing the utility of the pH adjusted soy protein isolate as a food ingredient and as a substitute for conventional soy protein isolate ingredients.

While the present invention refers mainly to the production and use of soy protein isolates having a protein content of at least about 90 wt % (N×6.25) on a dry weight basis (d.b.), preferably at least about 100 wt %, it is contemplated that soy protein products of lesser purity may be provided and used having similar properties to the soy protein isolate. Such lesser purity products may have a protein concentration of at least about 60 wt % (N×6.25) d.b. These soy protein products can be used to replace conventional soy protein products in various food applications.

GENERAL DESCRIPTION OF INVENTION

The first step in preparing the pH adjusted soy protein products of the present invention is to prepare a soy protein product according to aforementioned U.S. patent application Ser. No. 12/603,087, as follows.

The process of providing this soy protein product initially involves solubilizing soy protein from a soy protein source. The soy protein source may be soybeans or any soy product or by-product derived from the processing of soybeans, including but not limited to soy meal, soy flakes, soy grits and soy flour. The soy protein source may be used in the full fat form, partially defatted form or fully defatted form. Where the soy protein source contains an appreciable amount of fat, an oil-removal step generally is required during the process. The soy protein recovered from the soy protein source may be the protein naturally occurring in soybean or the proteinaceous material may be a protein modified by genetic manipulation but possessing characteristic hydrophobic and polar properties of the natural protein.

Protein solubilization from the soy protein source material is effected most conveniently using calcium chloride solution, although solutions of other calcium salts may be used. In addition, other alkaline earth metal compounds may be used, such as magnesium salts. Further, extraction of the soy protein from the soy protein source may be effected using calcium salt solution in combination with another salt solution, such as sodium chloride. Additionally, extraction of the soy protein from the soy protein source may be effected using water or other salt solution, such as sodium chloride, with calcium salt subsequently being added to the aqueous soy protein solution produced in the extraction step. Precipitate formed upon addition of the calcium salt is removed prior to subsequent processing.

As the concentration of the calcium salt solution increases, the degree of solubilization of protein from the soy protein source initially increases until a maximum value is achieved. Any subsequent increase in salt concentration does not increase the total protein solubilized. The concentration of calcium salt solution which causes maximum protein solubilization varies depending on the salt concerned. It is usually preferred to utilize a concentration value less than about 1.0 M, and more preferably a value of about 0.10 to about 0.15 M.

In a batch process, the salt solubilization of the protein is effected at a temperature of from about 1° C. to about 100° C., preferably about 15° to about 60° C., more preferably about 15° C. to about 35° C., preferably accompanied by agitation to decrease the solubilization time, which is usually about 1 to about 60 minutes. It is preferred to effect the solubilization to extract substantially as much protein from the soy protein source as is practicable, so as to provide an overall high product yield.

In a continuous process, the extraction of the soy protein from the soy protein source is carried out in any manner consistent with effecting a continuous extraction of soy protein from the soy protein source. In one embodiment, the soy protein source is continuously mixed with the calcium salt solution and the mixture is conveyed through a pipe or conduit having a length and at a flow rate for a residence time sufficient to effect the desired extraction in accordance with the parameters described herein. In such a continuous procedure, the salt solubilization step is effected rapidly, in a time of up to about 10 minutes, preferably to effect solubilization to extract substantially as much protein from the soy protein source as is practicable. The solubilization in the continuous procedure is effected at temperatures between about 1° C. and about 100° C., preferably about 15° to about 60° C., more preferably between about 15° C. and about 35° C.

The extraction is generally conducted at a pH of about 5 to about 11, preferably about 5 to about 7. The pH of the extraction system (soy protein source and calcium salt solution) may be adjusted to any desired value within the range of about 5 to about 11 for use in the extraction step by the use of any convenient food grade acid, usually hydrochloric acid or phosphoric acid, or food grade alkali, usually sodium hydroxide, as required.

The concentration of soy protein source in the calcium salt solution during the solubilization step may vary widely. Typical concentration values are about 5 to about 15% w/v.

The protein extraction step with the aqueous salt solution has the additional effect of solubilizing fats which may be present in the soy protein source, which then results in the fats being present in the aqueous phase.

The protein solution resulting from the extraction step generally has a protein concentration of about 5 to about 50 g/L, preferably about 10 to about 50 g/L.

The aqueous calcium salt solution may contain an antioxidant. The antioxidant may be any convenient antioxidant, such as sodium sulfite or ascorbic acid. The quantity of antioxidant employed may vary from about 0.01 to about 1 wt % of the solution, preferably about 0.05 wt %. The antioxidant serves to inhibit oxidation of any phenolics in the protein solution.

The aqueous phase resulting from the extraction step then may be separated from the residual soy protein source, in any convenient manner, such as by employing a decanter centrifuge or any suitable sieve, followed by disc centrifugation and/or filtration, to remove residual soy protein source material. The separated residual soy protein source may be dried for disposal. Alternatively, the separated residual soy protein source may be processed to recover some residual protein. The separated residual soy protein source may be re-extracted with fresh calcium salt solution and the protein solution yielded upon clarification combined with the initial protein solution for further processing as described below. Alternatively, the separated residual soy protein source may be processed by a conventional isoelectric precipitation procedure or any other convenient procedure to recover residual protein.

Where the soy protein source contains significant quantities of fat, as described in U.S. Pat. Nos. 5,844,086 and 6,005,076, assigned to the assignee hereof and the disclosures of which are incorporated herein by reference, then the defatting steps described therein may be effected on the separated aqueous protein solution. Alternatively, defatting of the separated aqueous protein solution may be achieved by any other convenient procedure.

The aqueous soy protein solution may be treated with an adsorbent, such as powdered activated carbon or granulated activated carbon, to remove colour and/or odour compounds. Such adsorbent treatment may be carried out under any convenient conditions, generally at the ambient temperature of the separated aqueous protein solution. For powdered activated carbon, an amount of about 0.025% to about 5% UV, preferably about 0.05% to about 2% w/v, is employed. The adsorbing agent may be removed from the soy solution by any convenient means, such as by filtration.

The resulting aqueous soy protein solution may be diluted generally with about 0.5 to about 10 volumes, preferably about 0.5 to about 2 volumes, of aqueous diluent in order to decrease the conductivity of the aqueous soy protein solution to a value of generally below about 90 mS, preferably about 4 to about 18 mS. Such dilution is usually effected using water, although dilute salt solution, such as sodium chloride or calcium chloride, having a conductivity of up to about 3 mS, may be used.

The diluent with which the soy protein solution is mixed may have a temperature of about 2° to about 70° C., preferably about 10° to about 50° C., more preferably about 20° to about 30° C.

The diluted soy protein solution then is adjusted in pH to a value of about 1.5 to about 4.4, preferably about 2 to about 4, by the addition of any suitable food grade acid, to result in a clear acidified aqueous soy protein solution. The clear acidified aqueous soy protein solution has a conductivity of generally below about 95 mS, preferably about 4 to about 23 mS.

The clear acidified aqueous soy protein solution may be subjected to a heat treatment to inactivate heat labile anti-nutritional factors, such as trypsin inhibitors, present in such solution as a result of extraction from the soy protein source material during the extraction step. Such a heating step also provides the additional benefit of reducing the microbial load. Generally, the protein solution is heated to a temperature of about 70° to about 160° C., for about 10 seconds to about 60 minutes, preferably about 80° to about 120° C. for about 10 seconds to about 5 minutes, more preferably about 85° to about 95° C., for about 30 seconds to about 5 minutes. The heat treated acidified soy protein solution then may be cooled for further processing as described below, to a temperature of about 2° to about 60° C., preferably about 20° C. to about 35° C.

The optionally diluted, acidified and optionally heat treated protein solution may optionally be polished by any convenient means, such as by filtering, to remove any residual particulates.

The resulting clear acidified aqueous soy protein solution may be directly dried to produce a soy protein product. In order to provide a soy protein product having a decreased impurities content and a reduced salt content, such as a soy protein isolate, the clear acidified aqueous soy protein solution may be processed prior to drying.

The clear acidified aqueous soy protein solution may be concentrated to increase the protein concentration thereof while maintaining the ionic strength thereof substantially constant. Such concentration generally is effected to provide a concentrated soy protein solution having a protein concentration of about 50 to about 300 g/L, preferably about 100 to about 200 g/L.

The concentration step may be effected in any convenient manner consistent with batch or continuous operation, such as by employing any convenient selective membrane technique, such as ultrafiltration or diafiltration, using membranes, such as hollow-fibre membranes or spiral-wound membranes, with a suitable molecular weight cut-off, such as about 3,000 to about 1,000,000 Daltons, preferably about 5,000 to about 100,000 Daltons, having regard to differing membrane materials and configurations, and, for continuous operation, dimensioned to permit the desired degree of concentration as the aqueous protein solution passes through the membranes.

As is well known, ultrafiltration and similar selective membrane techniques permit low molecular weight species to pass therethrough while preventing higher molecular weight species from so doing. The low molecular weight species include not only the ionic species of the food grade salt but also low molecular weight materials extracted from the source material, such as carbohydrates, pigments, low molecular weight proteins and anti-nutritional factors, such as trypsin inhibitors, which are themselves low molecular weight proteins. The molecular weight cut-off of the membrane is usually chosen to ensure retention of a significant proportion of the protein in the solution, while permitting contaminants to pass through having regard to the different membrane materials and configurations.

The concentrated soy protein solution then may be subjected to a diafiltration step using water or a dilute saline solution. The diafiltration solution may be at its natural pH or at a pH equal to that of the protein solution being diafiltered or at any pH value in between. Such diafiltration may be effected using from about 2 to about 40 volumes of diafiltration solution, preferably about 5 to about 25 volumes of diafiltration solution. In the diafiltration operation, further quantities of contaminants are removed from the clear aqueous soy protein solution by passage through the membrane with the permeate. This purifies the clear aqueous protein solution and may also reduce its viscosity. The diafiltration operation may be effected until no significant further quantities of contaminants or visible colour are present in the permeate or until the retentate has been sufficiently purified so as, when dried, to provide a soy protein isolate with a protein content of at least about 90 wt % (N×6.25) d.b. Such diafiltration may be effected using the same membrane as for the concentration step. However, if desired, the diafiltration step may be effected using a separate membrane with a different molecular weight cut-off, such as a membrane having a molecular weight cut-off in the range of about 3,000 to about 1,000,000 Daltons, preferably about 5,000 to about 100,000 Daltons, having regard to different membrane materials and configuration.

Alternatively, the diafiltration step may be applied to the clear acidified aqueous protein solution prior to concentration or to the partially concentrated clear acidified aqueous protein solution. Diafiltration may also be applied at multiple points during the concentration process. When diafiltration is applied prior to concentration or to the partially concentrated solution, the resulting diafiltered solution may then be additionally concentrated. The viscosity reduction achieved by diafiltering multiple times as the protein solution is concentrated may allow a higher final, fully concentrated protein concentration to be achieved. This reduces the volume of material to be dried.

The concentration step and the diafiltration step may be effected herein in such a manner that the soy protein product subsequently recovered contains less than about 90 wt % protein (N×6.25) d.b., such as at least about 60 wt % protein (N×6.25) d.b. By partially concentrating and/or partially diafiltering the clear aqueous soy protein solution, it is possible to only partially remove contaminants. This protein solution may then be dried to provide a soy protein product with lower levels of purity. The soy protein product is still able to produce clear protein solutions under acidic conditions.

An antioxidant may be present in the diafiltration medium during at least part of the diafiltration step. The antioxidant may be any convenient antioxidant, such as sodium sulfite or ascorbic acid. The quantity of antioxidant employed in the diafiltration medium depends on the materials employed and may vary from about 0.01 to about 1 wt %, preferably about 0.05 wt %. The antioxidant serves to inhibit the oxidation of any phenolics present in the concentrated soy protein solution.

The concentration step and the optional diafiltration step may be effected at any convenient temperature, generally about 2° to about 60° C., preferably about 20° to about 35° C., and for the period of time to effect the desired degree of concentration and diafiltration. The temperature and other conditions used to some degree depend upon the membrane equipment used to effect the membrane processing, the desired protein concentration of the solution and the efficiency of the removal of contaminants to the permeate.

There are two main trypsin inhibitors in soy, namely the Kunitz inhibitor, which is a heat-labile molecule with a molecular weight of approximately 21,000 Daltons, and the Bowman-Birk inhibitor, a more heat-stable molecule with a molecular weight of about 8,000 Daltons. The level of trypsin inhibitor activity in the final soy protein product can be controlled by manipulation of various process variables.

As noted above, heat treatment of the clear acidified aqueous soy protein solution may be used to inactivate heat-labile trypsin inhibitors. The partially concentrated or fully concentrated acidified soy protein solution may also be heat treated to inactivate heat labile trypsin inhibitors. When the heat treatment is applied to the partially concentrated acidified soy protein solution, the resulting heat treated solution may then be additionally concentrated.

In addition, the concentration and/or diafiltration steps may be operated in a manner favorable for removal of trypsin inhibitors in the permeate along with the other contaminants. Removal of the trypsin inhibitors is promoted by using a membrane of larger pore size, such as about 30,000 to about 1,000,000 Da, operating the membrane at elevated temperatures, such as about 30° to about 60° C., and employing greater volumes of diafiltration medium, such as about 20 to about 40 volumes.

Acidifying and membrane processing the diluted protein solution at a lower pH of about 1.5 to about 3 may reduce the trypsin inhibitor activity relative to processing the solution at higher pH of about 3 to about 4.4. When the protein solution is concentrated and diafiltered at the low end of the pH range, it may be desired to raise the pH of the retentate prior to drying. The pH of the concentrated and diafiltered protein solution may be raised to the desired value, for example pH 3, by the addition of any convenient food grade alkali such as sodium hydroxide.

Further, a reduction in trypsin inhibitor activity may be achieved by exposing soy materials to reducing agents that disrupt or rearrange the disulfide bonds of the inhibitors. Suitable reducing agents include sodium sulfite, cysteine and N-acetylcysteine.

The addition of such reducing agents may be effected at various stages of the overall process. The reducing agent may be added with the soy protein source material in the extraction step, may be added to the clarified aqueous soy protein solution following removal of residual soy protein source material, may be added to the concentrated protein solution before or after diafiltration or may be dry blended with the dried soy protein product. The addition of the reducing agent may be combined with a heat treatment step and the membrane processing steps, as described above.

If it is desired to retain active trypsin inhibitors in the concentrated protein solution, this can be achieved by eliminating or reducing the intensity of the heat treatment step, not utilizing reducing agents, operating the concentration and diafiltration steps at the higher end of the pH range, such as pH 3 to about 4.4, utilizing a concentration and diafiltration membrane with a smaller pore size, operating the membrane at lower temperatures and employing fewer volumes of diafiltration medium.

The concentrated and optionally diafiltered protein solution may be subject to a further defatting operation, if required, as described in U.S. Pat. Nos. 5,844,086 and 6,005,076. Alternatively, defatting of the concentrated and optionally diafiltered protein solution may be achieved by any other convenient procedure.

The concentrated and optionally diafiltered clear aqueous protein solution may be treated with an adsorbent, such as powdered activated carbon or granulated activated carbon, to remove colour and/or odour compounds. Such adsorbent treatment may be carried out under any convenient conditions, generally at the ambient temperature of the concentrated protein solution. For powdered activated carbon, an amount of about 0.025% to about 5% w/v, preferably about 0.05% to about 2% w/v, is employed. The adsorbent may be removed from the soy protein solution by any convenient means, such as by filtration.

The concentrated and optionally diafiltered clear aqueous soy protein solution may be dried by any convenient technique, such as spray drying or freeze drying. A pasteurization step may be effected on the soy protein solution prior to drying. Such pasteurization may be effected under any desired pasteurization conditions. Generally, the concentrated and optionally diafiltered soy protein solution is heated to a temperature of about 55° to about 70° C., preferably about 60° to about 65° C., for about 30 seconds to about 60 minutes, preferably about 10 minutes to about 15 minutes. The pasteurized concentrated soy protein solution then may be cooled for drying, preferably to a temperature of about 25° to about 40° C.

The dry soy protein product has a protein content in excess of about 60 wt % (N×6.25) d.b. Preferably, the dry soy protein product is an isolate with a high protein content, in excess of about 90 wt % protein, preferably at least about 100 wt % (N×625) d.b.

A variety of procedures may be used to provide the pH adjusted soy protein isolate according to the invention from the acid soluble soy protein isolate and to manipulate the functional properties thereof.

In one such procedure, the acid soy protein isolate product obtained as described above is formed into an aqueous solution, the pH of the aqueous solution is raised to about pH 6 and the material is dried. Alternatively, the precipitate formed on adjustment of the pH to 6 is recovered and these solids are dried to yield the soy protein isolate. As a further alternative, the pH 6 solution may be heated to a temperature of about 70° to about 160° C., for about 2 seconds to about 60 minutes, preferably about 80° to about 120° C., for about 15 seconds to about 15 minutes, more preferably about 85° to about 95° C., for about 1 to about 5 minutes, prior to drying the entire sample, or in yet another alternative procedure, recovering and drying only the insoluble solids from the heat treated sample.

In another alternative, the concentrated protein solution from step (h) described above for the preparation of the acid soluble soy protein product may be adjusted to pH about 6 to cause protein precipitation. The entire sample then may be dried or the precipitated solids may be collected and only these dried to form the isolate. Alternatively, the pH 6 solution may be heated to a temperature of about 70° to about 160° C., for about 2 seconds to about 60 minutes, preferably about 80° to about 120° C., for about 15 seconds to about 15 minutes, more preferably about 85° to about 95° C., for about 1 to about 5 minutes, prior to drying the entire sample or recovering and drying just the precipitated material.

In the procedures in which the precipitated solids are collected and dried, the remaining soluble protein fraction may also be processed to form a soy protein product. The soluble fraction may be dried directly or may be further processed by membrane concentration and/or diafiltration and/or heat treatment prior to drying.

EXAMPLES

In the Examples which follow, all freeze dried products were ground to a powder, the protein content of the powders was determined by a combustion method using a Leco Nitrogen Determinator and the moisture content of the powders was determined by an oven drying method. Spray dried products were analyzed similarly but did not require grinding prior to analysis.

Sensory evaluation of samples was performed as follows.

Samples were presented for sensory evaluation as a 2% protein w/v dispersion in purified drinking water at about pH 6. An informal panel of 6 to 8 panelists was asked to blindly compare the experimental sample to a sample of S013-K19-09A conventional IEP pH 6 product, prepared as described in Example 1 below, and to indicate which sample had the more beany flavour.

Example 1

This Example illustrates the preparation of a soy protein isolate by conventional isoelectric precipitation.

30 kg of soy white flake was added to 300 L of RO water at ambient temperature and the pH adjusted to 8.5 by the addition of 1M sodium hydroxide solution. The sample was agitated for 30 minutes to provide an aqueous protein solution. The pH of the extraction was monitored and maintained at 8.5 throughout the 30 minutes. The residual soy white flake was removed and the resulting protein solution clarified by centrifugation and filtration to produce 278.7 L of filtered protein solution having a protein content of 2.93% by weight. The pH of the protein solution was adjusted to 4.5 by the addition of HCl that had been diluted with an equal volume of water and a precipitate formed. The precipitate was collected by centrifugation then washed by re-suspending it in 2 volumes of RO water. The washed precipitate was then collected by centrifugation. A total of 32.42 kg of washed precipitate was obtained with a protein content of 18.15 wt %. This represented a yield of 72.0% of the protein in the clarified extract solution. An aliquot of 16.64 kg of the washed precipitate was combined with an equal weight of RO water and then the pH of the sample adjusted to 6 with sodium hydroxide. The pH adjusted sample was then spray dried to yield an isolate with a protein content of 93.80% (N×6.25) d.b. The product was designated S013-K19-09A conventional IEP pH 6.

Example 2

This Example illustrates one procedure for the preparation of a pH adjusted soy protein isolate.

30 kg of defatted, minimally heat processed soy flour was added to 300 L of 0.15 M $CaCl_2$ solution at ambient temperature and agitated for 30 minutes to provide an aqueous protein solution. An additional 300 L of 0.075 M $CaCl_2$ solution was added and the residual soy flour was removed and the resulting protein solution was clarified by centrifugation to produce 532.5 L of centrifuged protein solution having a protein content of 1.22% by weight. The pH of the sample was then lowered to 3.09 with diluted HCl.

The diluted and acidified protein extract solution was reduced in volume from 532 L to 107 L by concentration on a polyethersulfone (PES) membrane having a molecular weight cutoff of 100,000 Daltons. The concentration step and subsequent membrane processing steps were all conducted at approximately 30° C. The solution was diafiltered with 370 L of reverse osmosis (RO) purified water followed by further concentration to provide 37.86 kg of concentrated protein solution with a protein content of 13.97% by weight. This represented a yield of 81.4 wt % of the initial clarified protein solution.

A 1.5 kg sample of the concentrated protein solution was treated with a 25% w/v aqueous sodium hydroxide solution to raise the pH of the sample to 6 and form a precipitate. The precipitate was collected by centrifugation at 10,000 g and then freeze dried to form a product called S009-D27-09A S701N having a protein content of 106.53 wt % (N×6.25) on a dry weight basis.

All of the sensory panelists (6 of 6) evaluating the S009-D27-09A S701N rated this sample as less beany than the conventional PEP control, prepared as described in Example 1.

Example 3

This Example illustrates another procedure for the preparation of a pH adjusted soy protein isolate.

60 kg of defatted, minimally heat processed soy flour was added to 600 L of 0.15 M $CaCl_2$ solution at ambient temperature and agitated for 30 minutes to provide an aqueous protein solution. An additional 600 L of 0.075 M $CaCl_2$ solution was added and the residual soy flour was removed and the resulting protein solution was clarified by centrifugation and filtration to provide 975 L of filtered protein solution having a protein content of 1.15% by weight. A half volume of water was added and the pH of the sample lowered to 3.05 with diluted HCl.

The diluted and acidified protein extract solution was reduced in volume from 1505 L to 305 L by concentration on a polyethersulfone (PES) membrane having a molecular weight cutoff of 100,000 Daltons. The concentration step and subsequent membrane processing steps were all conducted at approximately 30° C. The solution was then diafiltered with 650 L of reverse osmosis (RO) purified water followed by further concentration to provide 59.44 kg of concentrated protein solution with a protein content of 15.51% by weight. This represented a yield of 82.2 wt % of the initial filtered protein solution.

A 10.20 kg sample of concentrated protein solution was diluted with an equal volume of water to aid mixing during the subsequent heating step.

The diluted solution was adjusted to pH 6 with a 25% w/v aqueous solution of sodium hydroxide and then heated to 95° C. for 5 minutes while mixing in a jacketed steam kettle. Heavy precipitation occurred on adjusting to pH 6.

The heated solution then was cooled and centrifuged at 4,000 g to separate the precipitated material from the soluble fraction. The resulting pellet was re-suspended in reverse osmosis (RO) purified water for spray drying. The dry product was designated S008-E11-09A S701NH and had a protein content of 101.02 wt % (N×625) on a dry weight basis.

The majority of the sensory panelists (5 of 8) evaluating the S008-E11-09A S701NH rated this sample as less beany than the conventional IEP control, prepared as described in Example 1.

Example 4

This Example illustrates another procedure for the preparation of a pH adjusted soy protein isolate.

30 kg of defatted, minimally heat processed soy flour was added to 300 L of 0.15 M $CaCl_2$ solution at ambient temperature and agitated for 30 minutes to provide an aqueous protein solution. An additional 300 L of 0.075 M $CaCl_2$ solution was added and the residual soy flour was removed and the resulting protein solution was clarified by centrifugation and filtration to produce 525 L of filtered protein solution having a protein content of 1.32% by weight. A half volume of water was added and the pH of the sample lowered to 3.08 with diluted HCl. The diluted and acidified protein solution was then heated at 90° C. for 1 minute then cooled to 50° C. for membrane processing.

The diluted, acidified and heat treated protein extract solution was reduced in volume from 781.5 L to 156.5 L by concentration on a polyethersulfone (PES) membrane having a molecular weight cutoff of 100,000 Daltons. The concentration step and all subsequent membrane processing steps were conducted at approximately 50° C. The solution was then diafiltered with 150 L of reverse osmosis (RO) purified water followed by further concentration to a volume of 43.5 L. The solution was then diafiltered with an additional 150 L of reverse osmosis (RO) purified water, then further concentrated to 19.5 L. RO water was then added to the sample to give a total mass of 72.74 kg of diluted protein solution having a protein concentration of 9.47 wt %. This represented a yield of 99.4% of the initial filtered protein solution.

A 30 kg sample of the diluted protein solution was adjusted to pH 6 with a 25% w/v aqueous sodium hydroxide solution and heated to 90° C. for 5 minutes while mixing in a jacketed steam kettle. Heavy precipitation of protein occurred on adjusting to pH 6.

The heated solution was cooled and the precipitate allowed to settle out. The soluble fraction was decanted off and replaced by an equal volume of water to re-suspend the solids. The slurry was allowed to settle and the liquid phase then was decanted again to remove the remaining traces of the soluble fraction.

The resulting precipitate was then spray dried. The dried product was designated S010-E26-09A S701NH and had a protein content of 101.46 wt % (N×6.25) on a dry weight basis.

All of the sensory panelists (6 of 6) evaluating the S010-E26-09A S701NH rated this sample as less beany than the conventional IEP control, prepared as described in Example 1.

Example 5

This Example illustrates another procedure for the preparation of a pH adjusted soy protein isolate.

30 kg of defatted, soy white flakes were added to 300 L of 0.13 M $CaCl_2$ solution at 60° C. and agitated for 30 minutes to provide an aqueous protein solution. The residual soy white flakes were removed and the resulting protein solution was clarified by centrifugation to produce 252.4 L of centrifuged protein solution having a protein content of 2.72% by weight. The clarified protein solution was then added to 188.7 L of reverse osmosis (RO) purified water at 60° C. and the pH of the sample lowered to 3.38 with dilute HCl.

420 L of the diluted and acidified protein extract solution was reduced in volume to 100 L by concentration on a polyethersulfone (PES) membrane, having a molecular weight cutoff of 100,000 Daltons, operated at a temperature of approximately 55° C. At this point, the acidified protein solution, with a protein content 4.82 wt %, was diafiltered with 150 L of reverse osmosis purified water, with the diafiltration operation conducted at approximately 56° C. The diafiltered solution was then concentrated to a volume of 52 L and diafiltered with an additional 468 L of RO water, with the diafiltration operation conducted at approximately 60° C. After this second diafiltration, the protein solution was concentrated from a protein content of 9.99% by weight to a protein content of 13.12% by weight and then diluted to a protein content of 6.44% by weight with water to facilitate spray drying or further processing. The diluted protein solution before spray drying or further processing was recovered in a yield of 74.7 wt % of the initial clarified protein solution.

A 1.8 kg sample of the diluted protein solution was treated with 6 M aqueous sodium hydroxide solution to raise the pH of the sample to 6.08 and form a precipitate. The sample was then freeze dried to yield a product called S023-L09-10A S701N (no fractionation). This product had a protein content of 103.47 wt % (N×6.25) d.b.

Another 1.8 kg sample of the diluted protein solution was further diluted with 1.8 L of RO purified water and then was treated with 6 M aqueous sodium hydroxide solution to raise the pH of the sample to 6.00 and form a precipitate. The pH 6 solution was heated to 95° C. for 5 minutes and then freeze dried. The dry product was called S023-L09-10A S701NH (no fractionation) and had a protein content of 103.14 wt % (N×6.25) d.b.

Example 6

This Example contains an evaluation of the solubility in water of the soy protein isolates produced by the methods of Examples 2 to 5. Protein solubility was evaluated using a modified version of the procedure of Morr et al., J. Food Sci. 50:1715-1718.

Sufficient protein powder to supply 0.5 g of protein was weighed into a beaker and then a small amount of reverse osmosis (RO) purified water was added and the mixture stirred until a smooth paste formed. Additional water was then added to bring the volume to approximately 45 ml. The contents of the beaker were then slowly stirred for 60 minutes using a magnetic stirrer. The pH was determined immediately after dispersing the protein and was adjusted to the appropriate level (2, 3, 4, 5, 6 or 7) with diluted NaOH or HCl. A sample was also prepared at natural pH. For the pH adjusted samples, the pH was measured and corrected two times during the 60 minutes stirring. After the 60 minutes of stirring, the samples were made up to 50 ml total volume with RO water, yielding a 1% protein w/v dispersion. The protein content of the dispersions was measured by combustion analysis using a Leco instrument. Aliquots of the dispersions were then centrifuged at 7,800 g for 10 minutes, which sedimented insoluble material and yielded a clear supernatant. The protein content of the supernatant was measured by Leco analysis and the protein solubility of the product was then calculated as follows: Solubility (%)=(% protein in supernatant/% protein in initial dispersion)×100

The natural pH values of the protein isolates produced in Examples 2 to 5 are shown in the following Table 1:

TABLE 1

Natural pH of dispersions prepared in water at 1% protein w/v

| batch | product | Natural pH |
|---|---|---|
| S009-D27-09A | S701N | 5.31 |
| S008-E11-09A | S701NH | 5.86 |
| S010-E26-09A | S701NH | 6.10 |
| S023-L09-10A | S701N (no fractionation) | 5.81 |
| S023-L09-10A | S701NH (no fractionation) | 5.71 |

The solubility results are set forth in the following Table 2.

TABLE 2

Solubility of products at different pH values

| Batch | Product | Solubility (%) | | | | | | |
|---|---|---|---|---|---|---|---|---|
| | | pH 2 | pH 3 | pH 4 | pH 5 | pH 6 | pH 7 | Nat. pH |
| S009-D27-09A | S701N | 89.1 | 100 | 41.4 | 5.4 | 31.3 | 77.1 | 5.1 |
| S008-E11-09A | S701NH | 13.8 | 5.5 | 4.0 | 0.0 | 11.7 | 9.0 | 4.1 |
| S010-E26-09A | S701NH | 6.6 | 0.0 | 0.0 | 0.0 | 0.0 | 0.0 | 0.0 |
| S023-L09-10A | S701N (no fractionation) | 97.7 | 100 | 8.3 | 0.0 | 4.8 | 8.9 | 0.0 |
| S023-L09-10A | S701NH (no fractionation) | 0.0 | 0.0 | 0.0 | 0.0 | 0.0 | 0.0 | 0.0 |

As may be seen from the results in Table 2, the S701N products were quite soluble at pH 2 and 3, but not as soluble at the other pH values tested. Addition of a heat treatment to form S701NH resulted in a product that was almost completely insoluble at all the pH values tested.

Example 7

This Example contains an evaluation of the water binding capacity of the soy protein isolates produced by the methods of Examples 2 to 5

Protein powder (1 g) was weighed into centrifuge tubes (50 ml) of known weight. To this powder was added approximately 20 ml of reverse osmosis purified (RO) water at the natural pH. The contents of the tubes were mixed using a vortex mixer at moderate speed for 1 minute. The samples were incubated at room temperature for 5 minutes then mixed with the vortex mixer for 30 seconds. This was followed by incubation at room temperature for another 5 minutes followed by another 30 seconds of vortex mixing. The samples were then centrifuged at 1,000 g for 15 minutes at 20° C. After centrifugation, the supernatant was carefully poured off, ensuring that all solid material remained in the tube. The centrifuge tube was then re-weighed and the weight of water saturated sample was determined.

Water binding capacity (WBC) was calculated as:

WBC(ml/g)=(mass of water saturated sample−mass of initial sample)/(mass of initial sample×total solids content of sample)

The water binding capacity results obtained are set forth in the following Table 3

TABLE 3

Water binding capacity of various products

| batch | product | WBC (ml/g) |
|---|---|---|
| S009-D27-09A | S701N | 2.40 |
| S008-E11-09A | S701NH | 3.71 |
| S010-E26-09A | S701NH | 3.60 |
| S023-L09-10A | S701N (no fractionation) | 2.90 |
| S023-L09-10A | S701NH (no fractionation) | 5.96 |

As may be seen from the results of Table 3, inclusion of a heat treatment in the preparation of the pH adjusted product resulted in a higher water binding capacity.

SUMMARY OF DISCLOSURE

In summary of this disclosure, the present invention provides procedures for producing soy protein isolates with near neutral natural pH values which can substitute for conventional soy protein isolates in a variety of food applications. Modifications are possible within the scope of the invention.

What we claim is:

1. A method of producing a soy protein product, which comprises:
    (a) extracting a soy protein source with an aqueous calcium salt solution, particularly calcium chloride solution, to cause solubilization of soy protein from the protein source and to form an aqueous soy protein solution,
    (b) separating the aqueous soy protein solution from residual soy protein source,
    (c) optionally diluting the aqueous soy protein solution,
    (d) adjusting the pH of the aqueous soy protein solution to a pH of about 1.5 to about 4.4 to produce an acidified clear soy protein solution,
    (e) optionally heat treating the acidified solution to reduce the activity of anti-nutritional trypsin inhibitors and the microbial load,
    (f) concentrating the aqueous clear soy protein solution while maintaining the ionic strength substantially constant by using a selective membrane technique,
    (g) optionally diafiltering the concentrated soy protein solution,
    (h) optionally pasteurizing the concentrated soy protein solution to reduce the microbial load,
    (i) adjusting the pH of the concentrated, optionally diafiltered and optionally pasteurized aqueous soy protein solution to about pH 6 to precipitate soy protein therefrom, and
    drying the pH adjusted solution of step (i) including the precipitated soy protein or
    recovering and drying the precipitated soy protein or
    heat treating the pH-adjusted solution of step (i) including the precipitated soy protein and then drying the heat treated, pH-adjusted solution including the precipitated soy protein or
    heat treating the pH-adjusted solution of step (i) including the precipitated soy protein then recovering and drying the precipitated soy protein.

2. The method of claim 1, wherein the pH of the aqueous soy protein solution is adjusted to pH about 2 to about 4.

3. The method of claim 1 wherein said heat treatment is effected at a temperature of about 70° to about 160° C. for about 2 seconds to about 60 minutes.

4. The method of claim 3 wherein said heat treatment is effected at a temperature of about 80° to about 120° C. for about 15 seconds to about 15 minutes.

5. The method of claim 4 wherein said heat treatment is effected at a temperature of about 85° to about 95° C. for about 1 to about 5 minutes.

* * * * *